(12) United States Patent
Stanton et al.

(10) Patent No.: US 6,375,249 B1
(45) Date of Patent: Apr. 23, 2002

(54) BODY STRUCTURE OF A MASS TRANSIT VEHICLE

(75) Inventors: William H. Stanton; Glenn Campbell; Sean McKay, all of Winnipeg (CA)

(73) Assignee: New Flyer Industries Limited, Winnipeg (CA)

(*) Notice: Subject to any disclaimer, the term of this patent is extended or adjusted under 35 U.S.C. 154(b) by 0 days.

(21) Appl. No.: 09/496,684

(22) Filed: Feb. 3, 2000

(51) Int. Cl.[7] .............. B60J 1/00; B60J 7/00; B60K 37/00; B60N 2/00; B60N 3/00
(52) U.S. Cl. .................. 296/178; 296/191
(58) Field of Search .................. 296/178, 181, 296/191, 204, 901, 903

(56) References Cited

U.S. PATENT DOCUMENTS

| | | | |
|---|---|---|---|
| 3,100,458 A | | 8/1963 | Baker et al. |
| 3,815,307 A | * | 6/1974 | Tantlinger |
| 3,981,107 A | * | 9/1976 | Schuback |
| 4,425,001 A | * | 1/1984 | Mauri |
| 5,042,395 A | | 8/1991 | Wackerle et al. |
| 5,066,067 A | | 11/1991 | Ferdows |
| 5,326,615 A | * | 7/1994 | Tsuchihashi et al. |
| 5,433,151 A | * | 7/1995 | Ohara et al. |
| 5,797,646 A | | 8/1998 | Jeunehomme et al. |
| 5,934,739 A | * | 8/1999 | Waldeck |

FOREIGN PATENT DOCUMENTS

| | | |
|---|---|---|
| DE | G88 07 208.8 | 9/1988 |
| DE | 39 16 065 | * 11/1990 |
| EP | 864483 | 9/1998 |
| JP | 63-232083 | * 3/1987 |

\* cited by examiner

*Primary Examiner*—Stephen T. Gordon
*Assistant Examiner*—Scott Carpenter
(74) *Attorney, Agent, or Firm*—Adrian D. Battison; Michael R. Williams

(57) ABSTRACT

A public transit vehicle has a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows. The roof and floor are formed from a welded frame structure over which is applied a molded panel formed in single panel structure and bonded to the frame structure. The panel is formed by molding a sandwich using a thermosetting resin through top and bottom fiber reinforced sheets and a honeycomb layer of resin impregnated paper and foam between the sheets. The floor panel is shaped so that its thickness varies and its top and bottom surfaces deviate from an otherwise planar structure to incline downwardly at a door way and to incline upwardly to clear structural elements. The side walls are clad by a coping panel connected to the roof panel and by a side wall panel beneath the windows. The cladding panels carry the wall insulation.

18 Claims, 8 Drawing Sheets

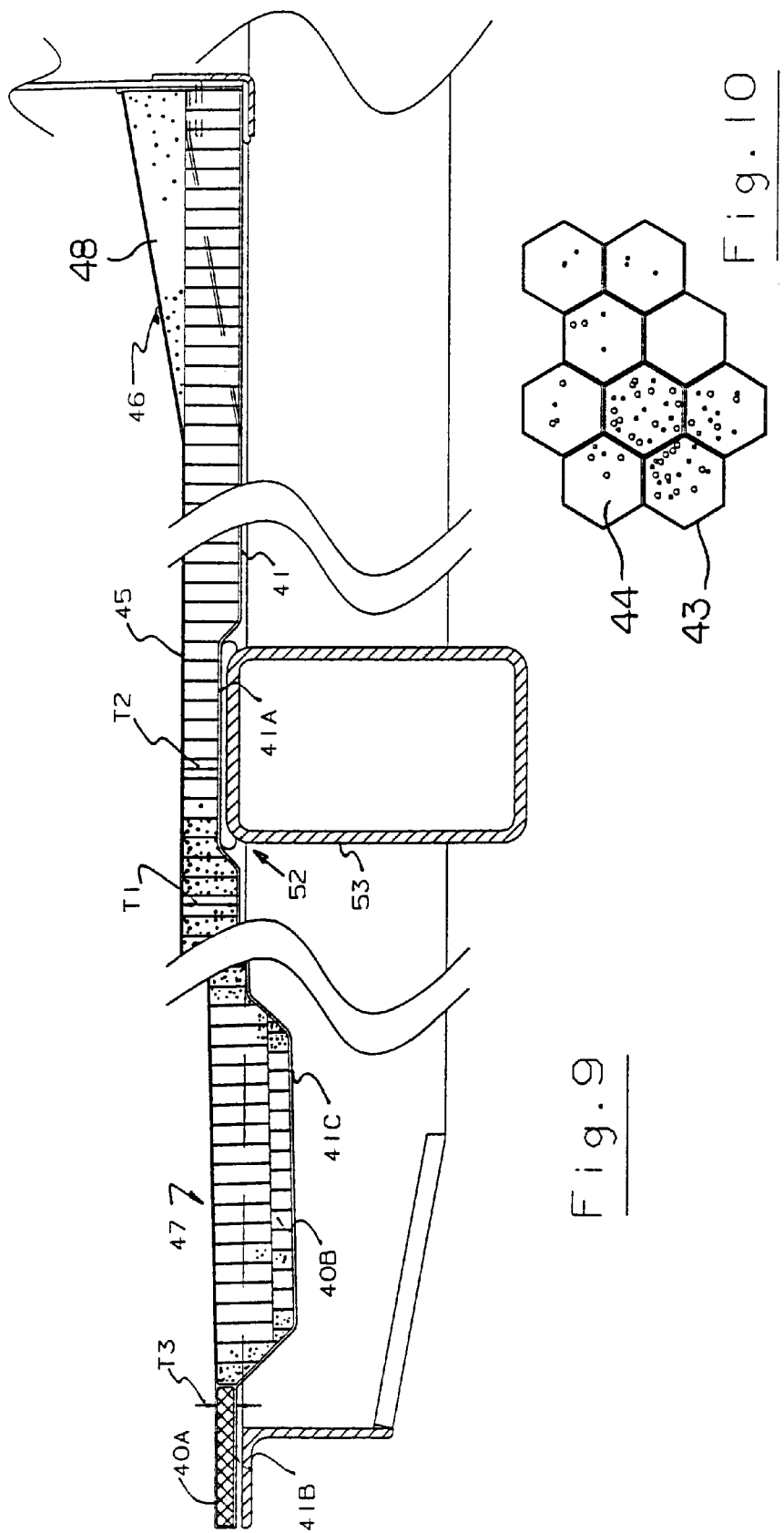

BODY STRUCTURE OF A MASS TRANSIT VEHICLE

This application is related to a series of four further applications all filed simultaneously with this application and assigned to the same assignee as follows:

Application Ser. No. 09/496,686 filed Feb. 3, 2000 and entitled Interior Structure of a Mass Transit Vehicle.

Application Ser. No. 09/497,634 filed Feb. 3, 2000 and entitled Passenger Lighting System for Mass Transit Vehicle.

Application Ser. No. 09/497,633 Feb. 3, 2000 and entitled Side Impact Structure of Mass Transit Vehicle.

Application Ser. No. 09/496,685 Feb. 3, 2000 and entitled Window Structure for Mass Transit Vehicle.

The disclosures of the above applications are incorporated herein by reference.

This invention relates to body structure of a mass transit vehicle and particularly to an arrangement including a fabricated frame over which are applied roof, floor and side cladding elements.

BACKGROUND OF THE INVENTION

Conventionally mass transit vehicles and particularly city buses are manufactured from a welded steel frame defining a floor frame, side wall frame and roof bows which is then clad using sheet cladding material riveted, glued or otherwise fixed to the frame. Insulation material is inserted between the frame members inside the exterior cladding and outside of the interior cladding.

The exterior cladding is conventionally sheet aluminium, stainless steel or fiberglass and this structure is highly labour intensive requiring extensive cutting, forming and attachment of the various cladding components.

The roof structure is similarly conventionally manufactured from sheet aluminium or molded fiberglass skins which is applied over the roof bows and similarly riveted or glued in place.

The flooring is conventionally applied from individual panels which are arranged edge to edge across the floor frame and fastened to the floor frame by conventional fasteners. The floor panels are often fabricated from plywood but however composite materials are also sometimes used including flooring panels manufactured from fibre reinforced plastics material. One particular panel is manufactured from top and bottom sheets of a fibrous mat applied on top and bottom surfaces of a honeycomb material manufactured from phenolic resin impregnated paper with a thermosetting foam introduced into the honeycomb cores. The honeycomb panel is available from Westwind Composites Inc under the trade mark Weskor.

However the panels are formed, they are conventionally rectangular and arranged edge to edge and cut to shape and to size to complete the necessary flooring overlay.

It is also proposed to manufacture bus structures from fibre reinforced composite plastics material so that the side walls, roof structure and floor are each formed separately from such composite materials and are attached together to form the complete bus structure without the necessity for an additional frame supporting the structure.

Examples are shown in the following.

German Utility Model G88 07 208.8 of Gottlob Auwarter GmbH which shows a molded body structure.

U.S. Pat. No. 3,100,458 of Bristol Aeroplane Plastics Ltd. which shows a molded railway vehicle body molded around framing elements.

U.S. Pat. No. 5,797,646 of GEC Alsthom Transport which shows a vehicle body molded as a roof structure, floor structure with upturned sides and a series of side panels.

European application 864,483 of Fokker Special Products which shows a vehicle body molded again in four pieces defined by a floor structure, roof structure and two side panels.

U.S. Pat. No. 5,042,395 of Messerschmitt-Bolkow-Blohm GmbH which shows a rail car formed from joined molded elements defined by a floor panel, a roof panel and two side walls using special corner connectors.

U.S. Pat. No. 5,066,067 of Relco, Inc. discloses a bus structure formed by molded side walls and a molded roof structure together with a floor defined by two plywood sheets and a covering fibreglass layer.

In all of the above arrangements, therefore, the floor structure is intended to be a structural member by itself which attaches to the sidewalls and the roof to form an integral structural assembly.

In arrangements where the structure is provided by a separate frame, it is conventional merely to apply a flooring layer over the frame of sufficient strength to support passengers and other elements located on the floor while not contributing significantly to the structural strength of the bus body itself.

SUMMARY OF THE INVENTION

It is one object of the present invention, therefore, to provide an improved public transit vehicle.

According to a first aspect of the invention there is provided a public transit vehicle comprising:

a vehicle body having:

a roof, two side walls each extending longitudinally of the vehicle including an upper side wall portion connecting to the roof and a row of windows underneath the upper portion, a vehicle floor;

two rows of seats for seated passengers each along a respective one of the side walls at the windows and defining a central aisle therebetween for standing and moving passengers;

a bottom frame including a plurality of rails supporting the floor;

two side frames each including a plurality of upstanding posts and a plurality of longitudinally extending members interconnecting the posts;

the vehicle floor including a flooring sheet spanning between the side walls and molded from a composite panel having an upper skin, a lower skin and an intervening core material layer, the panel containing a cured resin material and the upper and lower skins including reinforcing fibers;

the panel being substantially planar thus defining a floor plane and such that the upper skin forms a substantially flat floor surface;

the upper and lower skins being continuous over the extent of the panel so as, at least over a part of a length of the floor, to span between the side walls;

the panel having at least one first portion thereof at which the core material layer is of different thickness than at other portions wherein the upper skin is flat and the lower skin is shaped to follow the thickness of the core material layer;

and the panel having at least one second portion thereof at which the upper and lower skins are shaped out of the floor plane to form a raised or lowered section of the floor surface.

Preferably the core material layer includes at least parts thereof which are formed from a sheet of a honeycomb foam filled material.

Preferably the floor includes a front lower deck extending from a position adjacent a front wall to a transverse step and a rear upper deck extending from the transverse step to a rear wall with the transverse step between the decks, the front deck being formed from a single flooring sheet spanning substantially wholly from the position adjacent the front wall to the transverse step and between the side walls and the rear deck being formed from a single flooring sheet spanning substantially wholly from the rear wall to the transverse step and between the side walls.

Preferably the front deck includes a downwardly inclined second portion at a forward end thereof.

Preferably the rear deck includes an upwardly inclined second portion adjacent the rear wall.

Preferably the panel is planar at the side edges thereof.

Preferably the bottom frame includes two longitudinal side rails and a plurality of transverse rails and wherein the panel is attached to the rails of the bottom frame by adhesive.

Preferably the side walls each include an interior cladding portion which extends downwardly and inwardly to the floor panel and includes a bottom edge spaced inwardly from and covering the respective side edge of the floor panel.

Preferably the floor panel includes a floor covering bonded to and carried by the upper skin and wherein the floor covering engages over the bottom edge of the cladding portion.

Preferably the panel includes a first portion where the core material layer is of reduced thickness at an axle of the vehicle such that the floor defines a bottom recess into which the axle can project when raised in a suspension movement.

Preferably the panel includes a first portion wherein the core material is of increased thickness at a rear door of the vehicle.

According to a second aspect of the invention there is provided a public transit vehicle comprising:

a vehicle body having:

a roof, two side walls each extending longitudinally of the vehicle including an upper side wall portion connecting to the roof and a row of windows underneath the upper portion, a vehicle floor;

two rows of seats for seated passengers each along a respective one of the side walls at the windows and defining a central aisle therebetween for standing and moving passengers;

two side frames each including a plurality of upstanding posts and a plurality of longitudinally extending members interconnecting the posts;

a roof frame including a plurality of transverse beams spanning the roof;

each side wall including an exterior cladding structure attached to the side wall frame and carried thereby;

a roof sheet extending over the roof frame and supported thereby;

the roof sheet being molded from a composite panel having an upper skin, a lower skin and an intervening core material layer, the panel containing a cured resin material and the upper and lower skins including reinforcing fibers;

the upper and lower skins being continuous over the extent of the panel.

Preferably the panel is arched in transverse cross-section.

Preferably the exterior cladding structure of each side wall includes a curved coping panel which extends from the side wall upwardly and inwardly to the roof panel.

Preferably the coping panel includes a joint portion extending longitudinally of the panel at its edge adjacent the roof panel, the roof panel including an overlapping flange member extending longitudinally thereof at and overlapping with the joint portion of the coping panel.

Preferably the joint portion carries a sealing bead for sealing against the flange portion while allowing outward expansion movement of the flange portion of the roof panel relative to the joint portion of the coping panel.

Preferably the joint portion is integral with the coping panel and the flange portion is integral with the roof panel and forms an extension of the upper and lower skins thereof.

According to a third aspect of the invention there is provided a public transit vehicle comprising:

a vehicle body having:

a roof having a roof panel, two side walls each extending longitudinally of the vehicle including an upper side wall portion connecting to the roof and a row of windows underneath the upper portion, a vehicle floor;

two rows of seats for seated passengers each along a respective one of the side walls at the windows and defining a central aisle therebetween for standing and moving passengers;

two side frames each including a plurality of upstanding posts and a plurality of longitudinally extending members interconnecting the posts;

each side wall including an exterior cladding structure attached to the side wall frame and carried thereby;

the exterior cladding structure of each side wall including a curved coping panel which extends from the a top edge of the windows of the side wall upwardly and inwardly to the roof panel the exterior cladding structure of each side wall including a side wall panel which extends from a bottom edge of the windows of the side wall downwardly;

each of the coping panel and the side wall panel comprising a molded sheet defining an outer surface facing outwardly of the side wall and an inner surface, the inner surface carrying a layer of insulation material attached thereto and carried thereby.

Preferably each of the coping panel and the side wall panel is attached to the side wall frame by adhesive/sealant material.

Preferably the exterior cladding structure of each side wall includes a drip rail having a flange portion engaged underneath a bottom edge of the coping panel.

Preferably the coping panel includes a joint portion extending longitudinally of the panel at its edge adjacent the roof panel, the roof panel including an overlapping flange member extending longitudinally thereof at and overlapping with the joint portion of the coping panel.

Preferably the exterior cladding structure of each side wall includes a plurality of flexible impact panels arranged end to end longitudinally of a bottom edge of the side wall panel and attached thereto.

Preferably the flexible impact panels cover a layer of insulation attached to and carried by the side wall frame.

BRIEF DESCRIPTION OF THE DRAWINGS

One embodiment of the invention will now be described in conjunction with the accompanying drawings in which:

FIG. 9 is a schematic transverse cross section of a portion of the floor panel on an enlarged scale showing its structure and shaping to accommodate structural elements of the floor frame.

FIG. 10 is a horizontal cross section of the floor panel showing its honeycomb structure.

DETAILED DESCRIPTION

Figure 1:
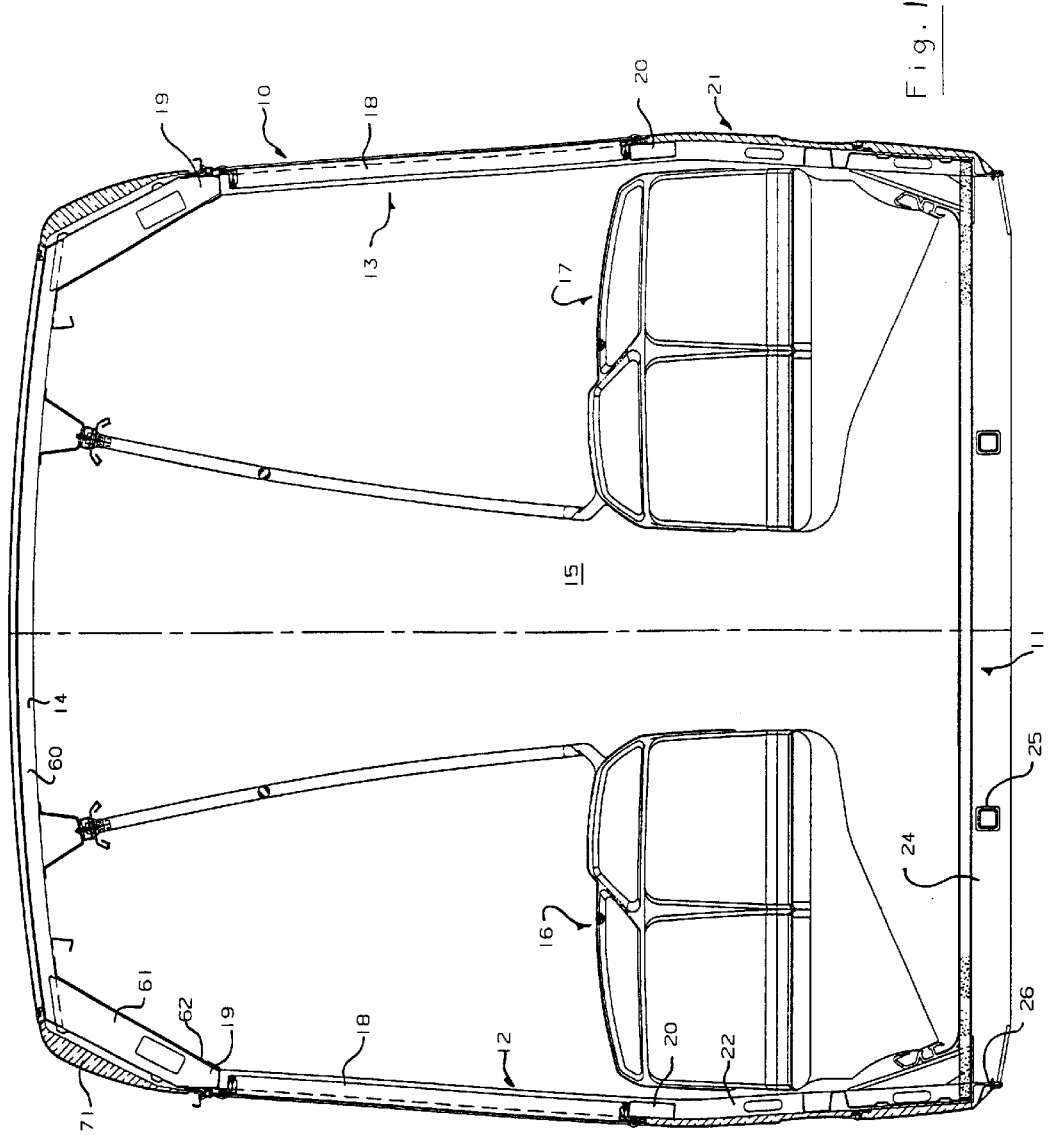
FIG. 1 is a transverse vertical cross sectional view through a public transit vehicle according to the present invention.

The vehicle 10 comprises a floor 11, side walls 12 and 13 and a roof structure 14. The vehicle includes a central aisle 15 between two rows 16 and 17 of passenger seats. Each side wall includes a row of windows 18 commencing at a top rail 19 and extending downwardly to an intermediate rail 20. Beneath the windows the side wall includes a cladded section 21.

The side wall structure further includes a plurality of vertical posts 22 at positions longitudinally of the side wall and extending from the floor structure 11 to the rail structure 19. The window openings are thus defined between the rail structure 19 and the rail 20 and in between the posts 22 and window frame arrangement is inserted into the window opening so defined as indicated generally at 23. The window frame structure from the subject matter of one of the co-pending applications identified above and therefore its structure will not be described herein in detail. The disclosure of the above mentioned application is incorporated herein by reference.

The floor structure 11 as best shown in FIGS. 2, 6, 7 and 8 comprises a plurality of transverse beams 24 and a plurality of longitudinal rails 25 and 26. The rails 26 are arranged at the side so as to be at the respective side wall and the posts 22 are welded to the side rail 26 so as to stand substantially vertically upwardly therefrom. Each side rail 26 comprises an angle defined by a horizontal flange 27 and a vertical flange 28 with the vertical flange spaced inwardly from an outermost edge 29 of the flange 27. The width of the flange 27 is substantially equal to that of the post.

The floor structure including the frame defined by the rails 24, 25 and 26 further includes a floor covering panel 30 lying over the frame defined by the rails and attached to the rails by a layer of adhesive 31. The transverse rails include main structural tubes 24A and C-shaped channels 24B.

Figure 6:
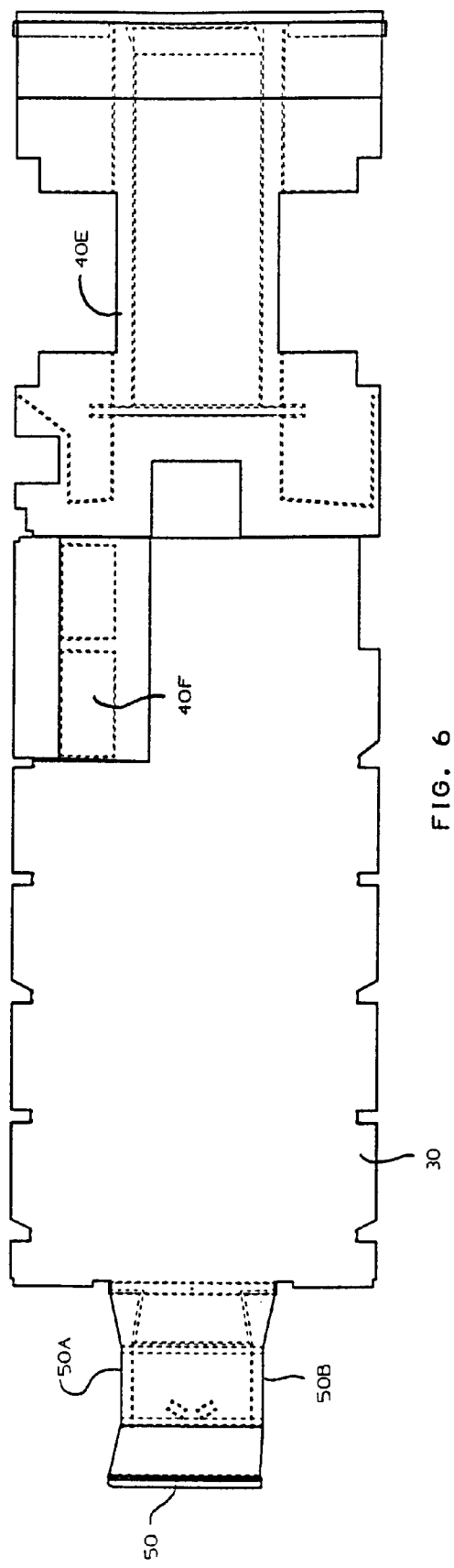
FIG. 6 is a top plan view of the floor panels for an upper deck and a lower deck of a low floor bus showing the shaping of the floor panels to accommodate structural elements of the floor frame.

The floor frame defines, as best shown in FIG. 6 an upper deck 32 and a lower front deck 33 with a step 34 therebetween. Each of the decks is formed by a frame structure defined by the rails. Each of the decks is covered by a respective one of two panels 30A and 30B. The panel 30A is continuous in length from the step 34 to a front rail 24C of the deck adjacent a front of the body structure. The front edge of the panel 30A connects to a vestibule of the vehicle which co-operates with the door and the driver's compartment and does not form part of the present invention and is therefore not shown. Similarly the panel 30B is continuous from the step 34 to a rear most rail 24D of the frame at a rear of the body.

Figure 2:
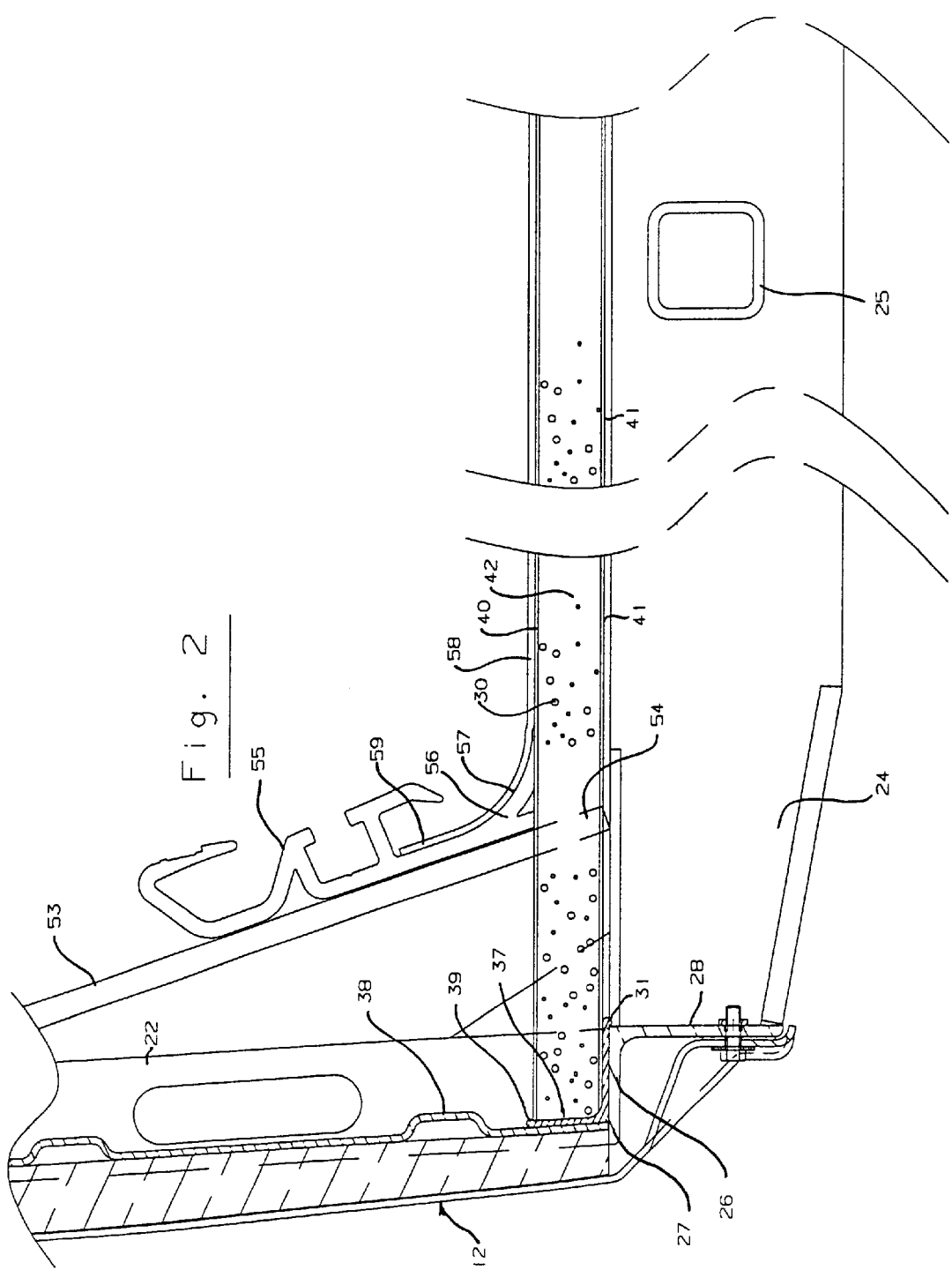
FIG. 2 is the same vertical cross sectional view as that of FIG. 1 on an enlarged scale and showing one bottom corner only at the bottom of one side wall and the adjacent side edge of the floor.

In addition each of the panels 30A and 30B is for the most part, except at a plurality of cut-outs for structural elements as described hereinafter, continuous across the full width of the body so as to extend from one side wall 12 to the other side wall 13. One side edge 37 is shown in FIG. 2 immediately at the side wall 12 and a symmetrical arrangement is provided at the other side wall 13. The edge 37 is bonded to a skirt member 38 of the sidewall in between the posts 22 of the sidewall. The construction arrangement of the skirt from the subject matter of one of the above co-pending applications, the disclosure of which is incorporated herein by reference.

A strip of bonding adhesive is indicated at 39 between the side edge 37 and the skirt 38. Thus the panel 30A and 30B are both fully continuous both longitudinally and transversely and are attached to the rails by adhesive so that the panels become structural member of the floor and allow communication of some forces through the full structure of the floor panel. The adhesive is an elastomer which allows for some damping of forces including acoustical energy.

As shown in FIGS. 9 and 10, the panels 30 are formed from a sandwich construction defined by an upper sheet 40, a lower sheet 41 and an intermediate core member 42. The core member is defined by a honeycomb formation of phenolic resin impregnated paper so as to define core member walls 43 formed of the paper and forming a hexagonal or honeycomb arrangement as shown in FIG. 10. The paper structure is reinforced by the phenolic resin and the honeycomb structure stands at right angles to the sheets 40 and 41 so as to form a rigid structural member between the sheets which is resistant to collapse in the vertical direction thus holding the sheets 40 and 41 apart at a predetermined spacing defined by the thickness of the honeycomb sheet. The spaces between the walls 43 are filled by a rigid foam material 44 so as to further provide structural strength for the core member sheet. The honeycomb thus acts as a web member between the sheets which are therefore in compression and tension respectively.

The top and bottom layers are formed by overlaid nonwoven mats of fibre reinforcing material such as glass fibre mats which provide fibres extending in directions at right angles to each other within the plane of the sheet so as to provide structural strength both transversely and longitudinally to the sheet. The fibres are preferably arranged in the longitudinal and transverse direction but alternative arrangements can use randomly laid fibres so as to provide the structural strength in the required different directions. A plurality of overlying mats are applied to provide the preferred amount of strength in accordance with engineered requirements.

The structure thus formed by the top and bottom sheets and the intervening core member is completed by the addition of a resin material injected or infused through the complete structure so as to unify the structure and ensure that the structure does not break down into separate components during usage up to the engineered forces.

As the top and bottom sheets are continuous over the complete floor panel, the application of a load at any one point on the floor panel places the top sheet 40 into compression and the bottom sheet 41 into tension and these loads are spread over the full extent of the panel. Thus the panel and the frame co-operate in accommodating loads applied to the floor structure and in addition provides structural stiffness to the frame and to complete structure of the body.

The floor panel is generally flat so that it lies in a common floor plane over the majority of its extent. Thus the side edges lie in the same common floor plane and meet the side walls generally at right angles to the side walls.

However the floor panel is also molded and shaped so that it accommodates particular requirements of the floor panel at particular locations on the floor panel. The main body of the floor panel thus lies in a common floor plane 45 but portions of the panel as indicated at 46 and 47 are formed or molded so as to lie out of the common plane 45. Thus at a rear edge of the rear panel 30B, a structural member 48 of the body projects to a position raised above the plane 45 thus requiring the portion 46 to incline upwardly and rearwardly at the rear wall to a raised edge end 49 which is raised out of the plane 45. The portions 46 and 47 are achieved by forming the panel in a mold which provides the required shape so that prior to injection or infusion of the resin and setting of the resin the top and bottom sheets are laid to the required locations and the core member between the sheets is cut and angled to take up the required position. The core member is relatively stiff but can be deformed to provide a gradual incline upwardly or downwardly. Prior to the addition of the resin and the top and bottom sheet and therefore when placed into the mold on top of the bottom sheet the core member can be deformed to the required position. However after application of the top sheet and the application of the resin and the setting of the resin, the structure is substantially rigid and maintains the molded shape defined by the portions 46 and 47. However to provide changes in thickness, and to mold the bottom surface to a required shape, this cannot be achieved by deforming the core member and instead the core member is machined or augmented to increase its thickness at the specifically required locations.

At the forward end 47, the floor panel is molded to take up a downwardly deformed position forming a central tongue portion 50 inclined downwardly from the plane 45. This downwardly deformed portion is located adjacent the door vestibule (not shown). This acts as a gradual transition between the vestibule floor, which is at the minimum height from the roadway at the door, and the main deck floor, which is at a slightly raised elevation above the road surface relative to the vestibule. In addition this may act so that any water collecting on the floor tends to run downwardly into the vestibule so as to be discharged from the door rather than collect over the area of the floor. The tongue portion is located between the wheel arches 50A and 50B as shown in the plan of FIG. 6.

In addition to the molding of the structure to form upwardly and downwardly deformed portions, the structure is also molded as indicated at 52 so as to accommodate the structural members 53 lying under the floor panel. This molding is effected by reducing the thickness of the core member at a predetermined location adjacent the structure 53 so that the bottom sheet 41 is deformed upwardly into a raised portion 41A and the thickness T1 of the core member is reduced to a smaller thickness T2.

Also, the thickness of the floor panel at certain locations thereon is reduced to a yet further reduced thickness T3 in an area 41B. As the thickness is reduced beyond that at which the core member provided by the honeycomb provides sufficient stiffness, the honeycomb in this area is replaced by a plurality of layers of mat 40A reinforced by resin. In an alternative arrangement, the mat can be replaced by a hardboard or similar rigid product.

Yet further, the thickness of the floor panel can be increased at certain locations such as that indicated at 41C where an additional layer 40B of the honeycomb is added underneath the basic layer to increase the thickness of the core.

Figure 8:
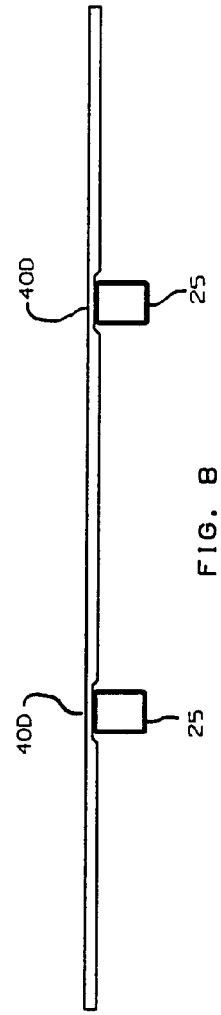
FIG. 8 is a transverse cross section of the floor panel taken along the lines 8—8 of FIG. 6.
Figure 7:
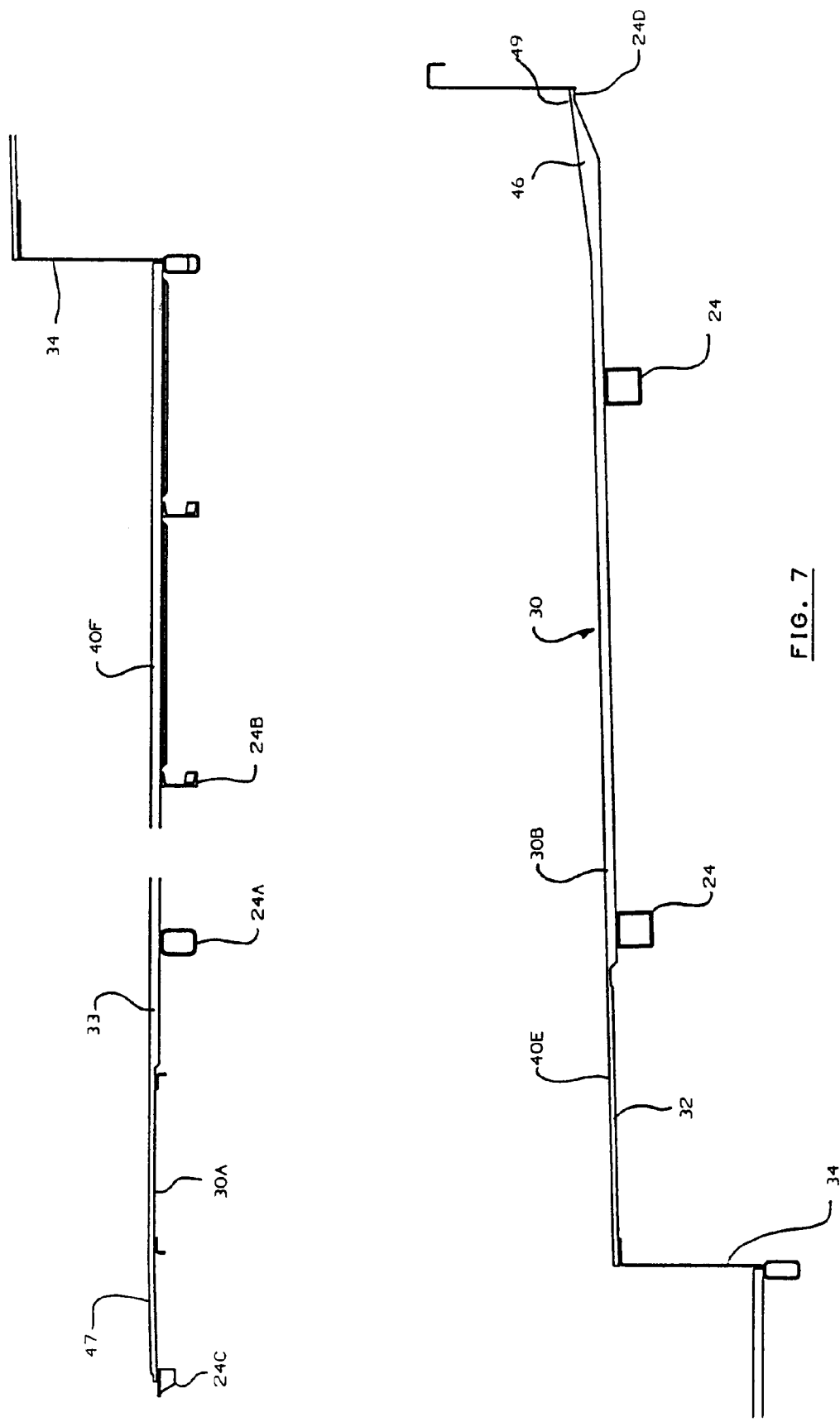
FIG. 7 is a longitudinal cross section of the floor panels showing their shaping to accommodate structural elements of the floor frame and to accommodate different loads at different locations.

The floor panels 30A and 30B are tailored using the above thickness variations so as to accommodate various components of the floor frame and underlying structure. Thus as shown in FIG. 8, the thickness of the floor is decreased at locations 40D over a pair of longitudinal frame members 25. As shown in FIG. 7, the thickness of the floor is reduced at a forward end of the rear panel as indicated at 40E to accommodate underlying structures. As shown in FIG. 7, the thickness of the floor panel is increased as indicated at 40F in between two of the transverse rails at the location adjacent the door so as to provide additional structural strength to accommodate the fact that a number of passengers may be standing adjacent the door in a relatively cramped area for exit.

In addition the thickness of the floor is reduced in the area 41B as shown in FIG. 9 to accommodate elements of the transverse front axle. This allows the floor to be moved downwardly absolutely as far as possible while providing merely sufficient tolerance to accommodate upward movement of the axle into the recess area 41B.

In areas where overall panel thickness is reduced to less than 15 mm over a span, the foam filled honeycomb core does not provide enough stiffness to support the engineering load. Accordingly, rigid materials such as medium density fiber board or solid, glass reinforced polyester resin panels of the requisite thickness are insert molded into the panel. This is the case at the incline at the forward end of panel 30A as well as at the threshold of the exit door in the same panel. Additional reinforcement is added to the incline adjacent the rear exit door in the form of foam filled honeycomb panels which increase the overall thickness of the floor in that area. The thickness is on the underside of the floor, extending downwards between the elements of the chassis (or bottom frame). In panel 30B, there are two areas where solid inserts are employed; at the rear of 30B, the top surface of the floor is sharply inclined. This is created by inserting a machined foam block into the mold between the core and the glass fibre reinforcement for the top sheet, before injection of the resin.

In this way the complete floor panel for the body is formed in two separate panel portions 30A and 30B which are shaped so as to exactly overlie the required frame and structural elements so that the floor panel can be applied as a single piece in an early or first step in the application of interior and travelling elements onto the fabricated plane. This significantly reduces the cost of the floor structure since the labour content is significantly reduced relative to the conventional technique of application, fastening and joint filling of individually cut elements which are arranged edge to edge.

As shown in FIG. 2, a structural gusset 53 is located adjacent each post 22 and extends therefrom downwardly and inwardly to a bottom end 54 located at a position spaced inwardly from the post on the floor frame at a transverse rail 24. A longitudinally continuous mounting rail 55 is mounted so as to span along the length of the deck as attached to each of the gussets 53. The mounting rail 55 provides a structural support for the cantilever mounting of the seats 16, 17. In addition the rail 55 provides amounting for an internal cladding element forming a panel on the inside surface of the side wall. Further details of the rail 55 are described in one of the above mentioned co-pending applications, this disclosure which is incorporated herein by reference. The rail 55 includes a smoothly curved base portion 56 which extends downwardly and inwardly to provide a concave surface 57 smoothly joining with the floor panel 30.

The panel 30 has a plurality of cutouts to accommodate the gussets 53 and the posts 22. The floor panel extends underneath the rail 55 so as to butt against the side wall as previously explained. Thus the smooth surface 57 provides an attractive appearance at the floor but does not interfere with or affect the structural aspects of the floor panel and its interrelation with the frame rails.

A floor covering sheet 58 having the required colouring and attractive appearance is supplied in place on the top sheet 40 and attached thereto by a suitable adhesive. When supplied an edge, portion 59 of the floor covering is left detached from the top sheet 40 so that after the rail 55 is applied, the edge portion 59 can be inserted in place over the curved surface 57 and onto the rail so as to provide the attractive appearance of the floor smoothly curving onto the bottom portion of the rail 55.

Figure 3:
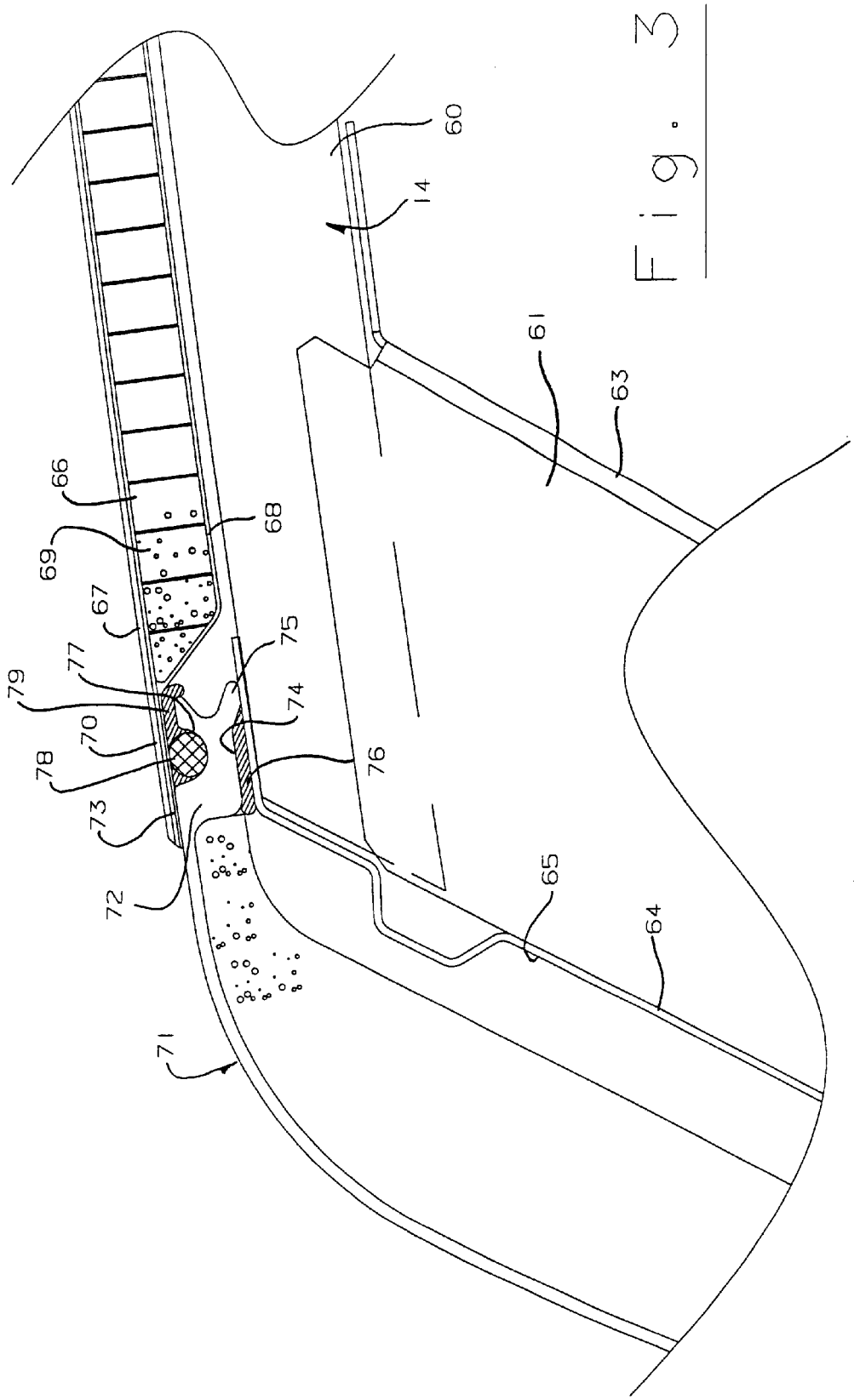
FIG. 3 is the same vertical cross sectional view as that of FIG. 1 on an enlarged scale and showing one top corner only at the top of one coping panel and the adjacent side edge of the roof.

Turning now to FIG. 3 the roof structure is shown in more detail and this includes a plurality of longitudinally spaced transversely extending roof bows 60 which extend across the roof structure from one side wall to the other. Each roof bow is slightly curved so as to form an outwardly facing convex curvature for strength and for shedding water.

A U-shaped channel 62 is attached across the coping members 62 at the bottom and across the posts 22 at the top so as to define the rail 19 at the top of the window openings. Each roof bow attaches to a downwardly and outwardly inclined structural coping element 61 which is welded at its upper end to the roof bow and at its lower end to the U-shaped channel 62.

The coping member thus defines an inner surface 63 which is inclined downwardly and outwardly from a position inwardly of an end of the roof bow to an inside of the side wall together with an outer surface 64 which is similarly inclined and connects with an outer surface of the side wall. A stiffening cover sheet 65 is attached along the roof bows and extends from the roof bow downwardly onto the outside surface 64 of each of the coping members so as to form in effect a rail structure along the body at the top corner.

The roof frame defined by the bows 60 is covered by a single piece panel 66 which is molded and shaped from the same materials and in the same manner as described in regard to the floor panel 30. The roof panel is molded with a slight curvature so as to match the convex curvature of the roof bows. The panel is molded so that at the side edges the upper and lower sheets 67 and 68 respectively are brought around the angled edge of the core member 69 so as to form an edge flange 70 extending along the full length of the side edge of the panel 66. Thus the flange 70 is formed by the top and bottom sheets together with the integrating resin in set condition so as to form a flange projecting outwardly from the side of the panel and lying in the top surface of the panel containing the top sheet 67. This arrangement is also used at the rear edge (not shown). There is a fundamental difference between the roof sandwich and the floor sandwich: the roofs laminated skins are comprised of a pre-finished exterior skin panel of glass reinforced gel coat panel known of the type under the trade mark "Filon"; backed by a layer of continuous strand mat. This is followed by the foam filled honeycomb core, which is finished on the bottom side by a layer of bi-axial stitch mat (as per the floor). The entire stack is infused with catalyzed resin, which among other things, bonds the continuous strand mat to the gel coat panel, unifying the sandwich. The floor does not feature any pre-finished material.

Figure 4:
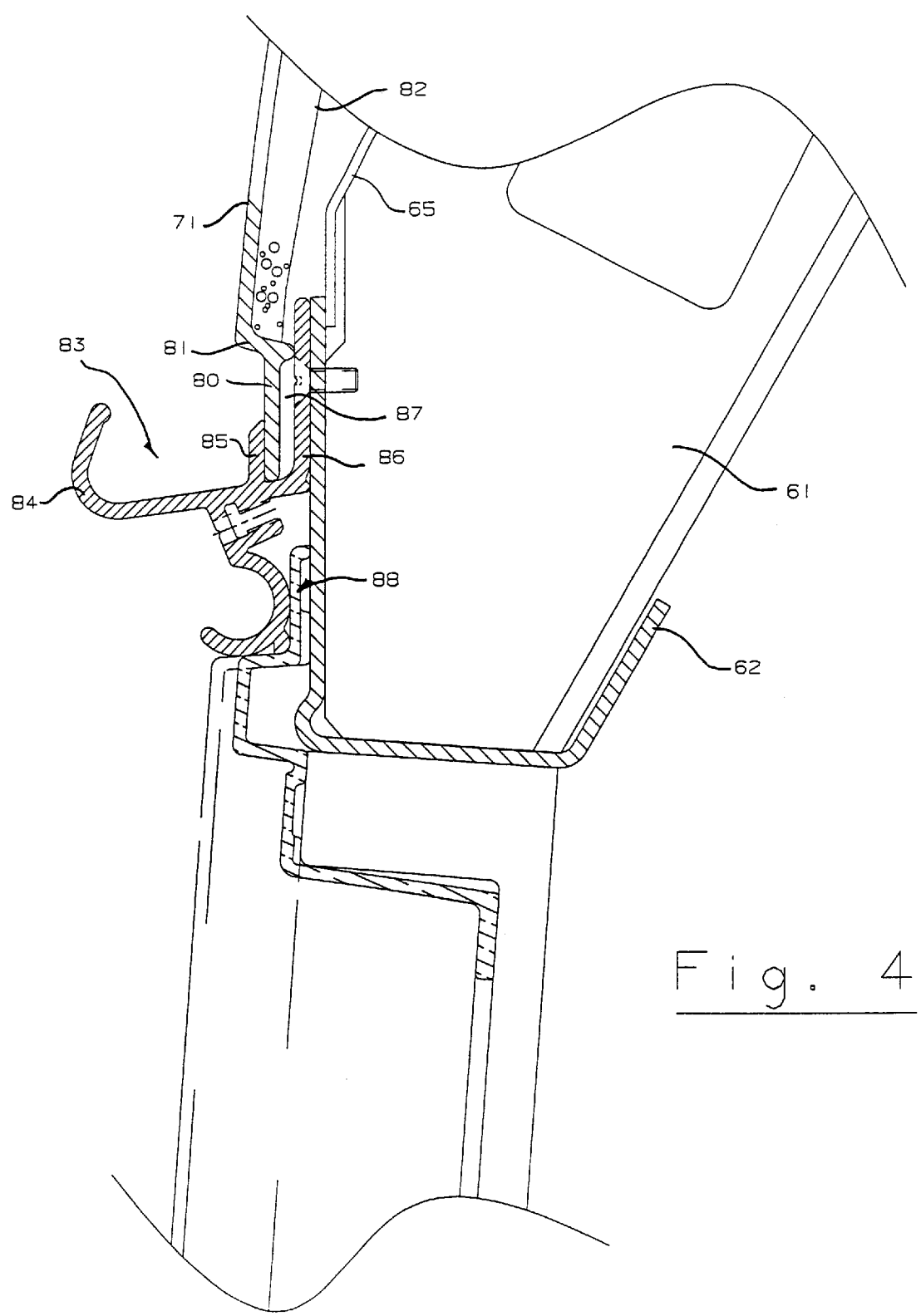
FIG. 4 is the same vertical cross sectional view as that of FIG. 1 on an enlarged scale and showing one part only at the bottom of one coping panel and the top edge of the adjacent window opening.

The coping members are covered by a cladding structure including a coping panel 71. The coping panel 71 is formed by pultrusion from a fibre-reinforced resin material. A top end of the panel 71 is shown in FIG. 3 and a bottom end of the same panel is shown in FIG. 4. The panel is smoothly curved from a generally horizontal portion at the top end to a generally vertical portion at the bottom end. The curvature provides an attractive coping appearance and a resistance to surface distortions as a function of shrinkage during the curing process and is thus superior to otherwise flat panels at the same location. The panel is spaced outwardly from the sheet 65.

At the upper end, the panel includes an edge portion 72 which forms a rib at the edge of increased thickness relative to the main body of the panel so that an upper surface 73 of the rib is substantially coplanar with the top surface of the panel 66. The bottom surface 74 of the rib is closely adjacent the top surface of the sheet 65. A downwardly projecting edge portion 75 supports the bottom edge 74 slightly away from the sheet 65 sufficient to receive a bead 76 of adhesive holding the rib 72 in place at the edge of the roof bow.

The flange 70 directly overlies the surface 73 and is in contact with the surface 73 at the main body 71 so as to overlie the main body 71 at its junction with the bead. An outer part of the surface 73 is recessed to define a channel 77 for receiving a resilient sealing bead 78. Beyond the channel 77, the surface 73 is slightly recessed to allow introduction of an elastomeric adhesive strip 79. Thus the flange 70 is bonded to the rib 72 and is maintained in place on the rib 72 thus holding the roof structure together. The bead 78 and the elastomeric adhesive 79 provides sufficient resilience to accommodate expansion and contraction of the roof panel caused by changes in temperature.

At the bottom edge of the panel 71 is provided a flange 80 which extends downwardly therefrom. The flange 80 is attached to a lip portion 81 which extends toward the frame structure of the side wall thus supporting the main body of the panel 71 away from the frame structure. A layer 82 of foamed insulation is applied on the inside surface of the main body of the panel between the rib 72 and the lip 81. Thus the insulation is carried by the panel 71 and is therefore attached to the structure of the vehicle body simply and easily by the attachment of the panel to the body.

Underneath the flange 80 is provided a drip rail member generally indicated at 83 which forms a channel 84 and a two upwardly extending flanges 85 and 86. The flange 80 is inserted between the flanges 85 and 86 and is bonded to the flange by a bead of elastomeric adhesive 87. The flange 86 is attached to the outer wall of the channel bracket 62 thus holding the drip rail member on the structure. The flange 80 overlaps the drip rail member so that any water running down the outside surface of the panel 71 runs into the drip rail member for collection therein.

The drip rail member further co-operates with a window structure generally indicated at 88 which is the subject of one of the above mentioned co-pending applications the subject matter of which is incorporated herein by reference.

Figure 5:
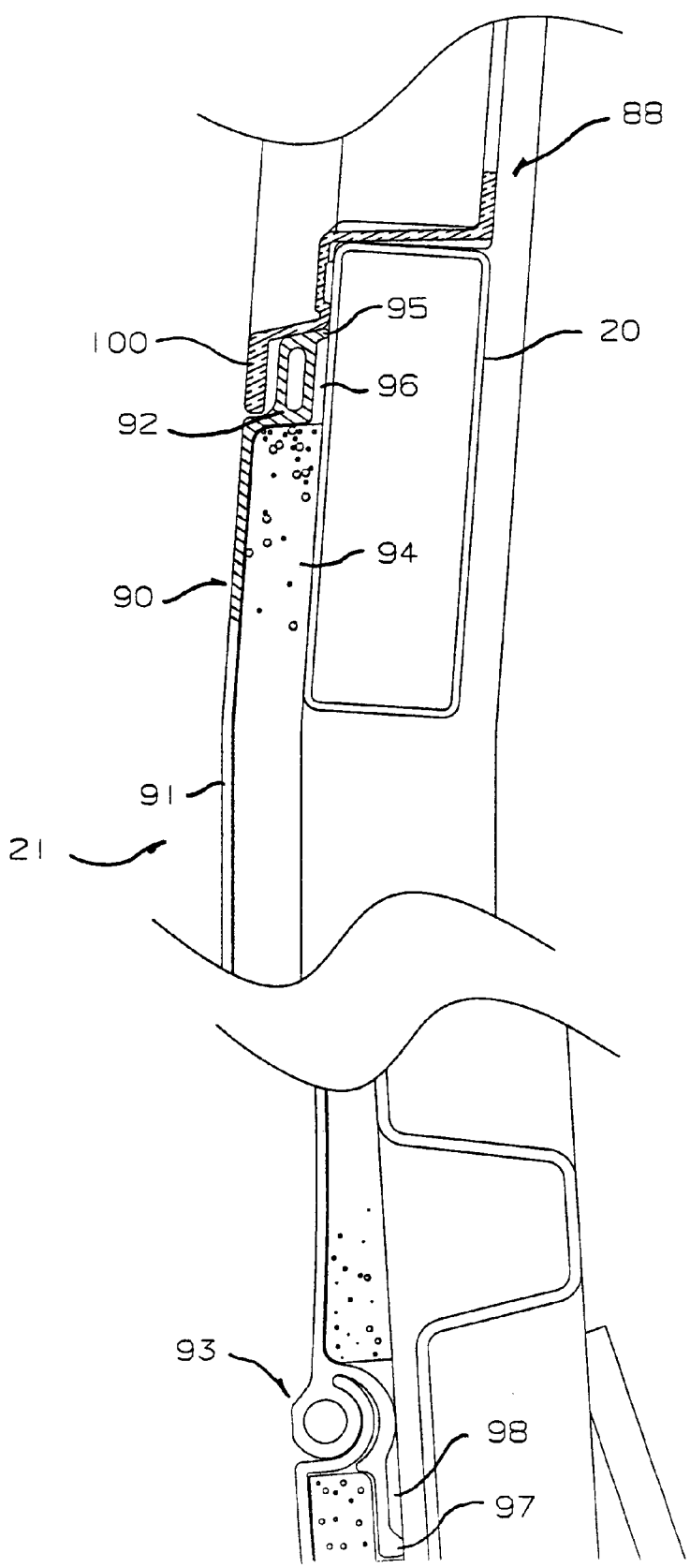
FIG. 5 is the same vertical cross sectional view as that of FIG. 1 on an enlarged scale and showing the bottom of the window opening and the adjacent side cladding panel.

Turning now to FIG. 5, the bottom edge of the window structure 88 is shown and this co-operates with a second panel arrangement 90 formed as a cladding on the outside of the side wall frame. The panel 90 includes a main panel body 91 together with an upper mounting rib 92 and a lower coupling and mounting assembly 93. The main body 91 defines a sheet with the rib 92 and the coupling 93 forming lip portions which extend from the main body sheet 91 toward the side wall. Between the lips at the top and bottom of the sheet is applied a layer of insulation 94 which is attached on the inside surface of the main body sheet 91.

The rib 92 at the top has an end projection 95 which engages the outside surface of the side wall leaving a recess 96 into which an adhesive is applied for attachment of the panel to the sidewall. At the bottom the coupling 93 also includes a lip or projection 97 leaving a recess 98 by which the coupling is adhesively attached to the side wall posts.

The coupling 93 co-operates with a further panel arrangement 99 and again the further panel and its coupling are subject one of the above co-pending applications the disclosure of which is incorporated herein by reference.

The cladding for the side wall is therefore provided by two longitudinal main panels 71 and 90 which are arranged at the top and bottom respectively of the window structure and extend substantially continuously along the length of the body so as to provide an attractive appearance which is resistant to corrosion and thermal expansion and contraction due to high glass and filler loading (more than 50% glass reinforcement). The window structure 88 includes an outwardly and downwardly turned lip 100 which engages over the rib 92. Thus the cladding panels are arranged so that each upper joint provides an overlapping section providing an effective water shedding action.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A public transit vehicle comprising:

a vehicle body having:

a roof, two side walls each extending longitudinally of the vehicle including an upper side wall portion connecting to the roof and a row of windows underneath the upper portion, a vehicle floor;

two rows of seats for seated passengers each along a respective one of the side walls at the windows and defining a central aisle therebetween for standing and moving passengers;

a bottom frame including a plurality of rails supporting the floor;

two side frames each including a plurality of upstanding posts and a plurality of longitudinally extending members interconnecting the posts;

the vehicle floor including a flooring sheet spanning between the side walls and molded from a composite panel having an upper skin, a lower skin and an intervening core material layer, the panel containing a cured resin material and the upper and lower skins including reinforcing fibers;

the panel being substantially planar such that the upper skin forms a substantially flat floor surface;

the upper and lower skins being continuous over the extent of the panel so as, at least over a part of a length of the floor, to span between the side walls;

wherein the panel has at least one first portion thereof at which the core material layer is of different thickness than at a main portion of the panel;

wherein the core material layer changes thickness between said first portion and said main portion and is continuous therebetween;

wherein the upper skin is flat and the lower skin is shaped to follow the thickness of the core material layer between the first portion and the main portion;

wherein the panel has at least one second portion thereof at which at least the upper skin is shaped out of the flat floor surface of the main portion;

and wherein the core material layer is continuous between the main portion and the second portion.

2. The vehicle according to claim 1 wherein the core material layer includes at least parts thereof which are formed from a sheet of a honeycomb foam filled material.

3. The vehicle according to claim 1 wherein the floor includes a front lower deck extending from a position adjacent a front wall to a transverse step and a rear upper deck extending from the transverse step to a rear wall with the transverse step between the decks, the front deck being formed from a single flooring sheet spanning substantially wholly from the position adjacent the front wall to the transverse step and between the side walls and the rear deck being formed from a single flooring sheet spanning substantially wholly from the rear wall to the transverse step and between the side walls.

4. The vehicle according to claim 3 wherein the front deck includes a downwardly inclined second portion at a forward end thereof.

5. The vehicle according to claim 3 wherein the rear deck includes an upwardly inclined second portion adjacent the rear wall.

6. The vehicle according to claim 1 wherein the panel is planar at the side edges thereof.

7. The vehicle according to claim 1 wherein the bottom frame includes two longitudinal side rails and a plurality of transverse rails and wherein the panel is attached to the rails of the bottom frame by adhesive.

8. The vehicle according to claim 1 wherein the side walls each include a rail which extends downwardly and inwardly to the floor panel and includes a bottom edge spaced inwardly from and covering the respective side edge of the floor panel.

9. The vehicle according to claim 8 wherein the floor panel includes a floor covering bonded to and carried by the upper skin and wherein the floor covering engages over the bottom edge of the rail.

10. The vehicle according to claim 1 wherein the panel includes a first portion where the core material layer is of reduced thickness at an axle of the vehicle such that the floor defines a bottom recess into which the axle can project when raised in a suspension movement.

11. The vehicle according to claim 1 wherein the panel includes a first portion wherein the core material is of increased thickness at a rear door of the vehicle.

12. A public transit vehicle comprising:

a vehicle body having:

a roof, two side walls each extending longitudinally of the vehicle including an upper side wall portion connecting to the roof and a row of windows underneath the upper portion, a vehicle floor;

two rows of seats for seated passengers each along a respective one of the side walls at the windows and defining a central aisle therebetween for standing and moving passengers;

two side frames each including a plurality of upstanding posts and a plurality of longitudinally extending members interconnecting the posts;

a roof frame including a plurality of transverse beams spanning the roof;

each side wall including an exterior cladding structure attached to the side wall frame and carried thereby;

a roof sheet extending over the roof frame on top of the transverse beams of the roof frame;

the roof sheet being molded from a composite panel having an upper skin, a lower skin and an intervening core material layer, the panel containing a cured resin material and the upper and lower skins including reinforcing fibers;

the roof sheet, including the upper skin, lower skin and intervening core material, lying on top of the transverse beams of the roof frame so as to be supported thereby;

the upper and lower skins being continuous over the extent of the panel;

wherein the exterior cladding structure of each side wall includes a curved coping panel which extends from the side wall upwardly and inwardly to the roof panel;

wherein the coping panel includes a joint portion extending longitudinally of the panel at its edge adjacent the roof panel, the roof panel including an overlapping flange member extending longitudinally thereof at and overlapping over the joint portion of the coping panel;

wherein the joint portion is integral with the coping panel; and wherein the flange portion is integral with the roof panel and forms an extension of the upper and lower skins thereof which are connected together and extend beyond an edge of the core material layer.

13. The vehicle according to claim 12 wherein the panel is arched in transverse cross-section.

14. The vehicle according to claim 12 wherein the joint portion carries a sealing bead for sealing against an underside of the flange portion while allowing outward expansion movement of the flange portion of the roof panel relative to the joint portion of the coping panel.

15. A public transit vehicle comprising:

a vehicle body having:

a roof having a roof panel, two side walls each extending longitudinally of the vehicle including an upper side wall portion connecting to the roof and a row of windows underneath the upper portion, a vehicle floor;

two rows of seats for seated passengers each along a respective one of the side walls at the windows and defining a central aisle therebetween for standing and moving passengers;

two side frames each including a plurality of upstanding posts and a plurality of longitudinally extending members interconnecting the posts;

each side wall including an exterior cladding structure attached to the side wall frame and carried thereby;

the exterior cladding structure of each side wall including a curved coping panel which extends from the a top edge of the windows of the side wall upwardly and inwardly to the roof panel the exterior cladding structure of each side wall including a side wall panel which extends from a bottom edge of the windows of the side wall downwardly;

the coping panel comprising a molded sheet formed from a single layer of coping panel sheet material defining an outer surface of the coping panel sheet material facing outwardly of the side wall and an inner surface of the coping panel sheet material;

the coping panel comprising a layer of coping panel insulation material attached to the inner surface of the coping panel sheet material and carried thereby;

the layer of coping panel insulation material being attached to the vehicle body by the attachment of the coping panel insulation material to the inner surface of the coping panel sheet material and by the attachment of the coping panel sheet material to the vehicle body;

the side wall panel comprising a molded sheet formed from a single layer of side wall panel sheet material defining an outer surface of the side wall panel sheet material facing outwardly of the side wall and an inner surface of the side wall panel sheet material;

the side wall panel comprising a layer of side wall panel insulation material attached to the inner surface of the side wall panel sheet material and carried thereby;

the layer of side wall panel insulation material being attached to the vehicle body by the attachment of the side wall panel insulation material to the inner surface of the side wall panel sheet material and by the attachment of the side wall panel sheet material to the vehicle body.

16. The vehicle according to claim 15 wherein each of the coping panel and the side wall panel is attached to the side wall frame by adhesive/sealant material.

17. The vehicle according to claim 15 wherein the exterior cladding structure of each side wall includes a drip rail having a flange portion engaged underneath a bottom edge of the coping panel.

18. The vehicle according to claim 15 wherein the coping panel includes a joint portion extending longitudinally of the panel at its edge adjacent the roof panel, the roof panel including an overlapping flange member extending longitudinally thereof at and overlapping with the joint portion of the coping panel.

* * * * *